US00RE35310E

United States Patent [19]

Moskovich

[11] E Patent Number: Re. 35,310

[45] Reissued Date of Patent: Aug. 6, 1996

[54] COLOR CORRECTED PROJECTION LENS

[75] Inventor: Jacob Moskovich, Cincinnati, Ohio

[73] Assignee: U.S. Precision Lens Incorporated, Cincinnati, Ohio

[21] Appl. No.: 961,510

[22] Filed: Oct. 15, 1992

Related U.S. Patent Documents

Reissue of:

[64] Patent No.: 4,963,007
Issued: Oct. 16, 1990
Appl. No.: 403,139
Filed: Sep. 5, 1989

[51] Int. Cl.[6] ..... G02B 3/02; G02B 13/18

[52] U.S. Cl. ..... 359/649; 359/650; 359/651; 359/715; 359/716; 359/754

[58] Field of Search ..... 359/648–651, 359/708, 713–716, 764, 784, 791, 754–756, 757, 763

[56] References Cited

U.S. PATENT DOCUMENTS

| | | | |
|---|---|---|---|
| 3,429,997 | 2/1969 | Rosner et al. . | |
| 3,800,085 | 3/1974 | Ambats et al. . | |
| 4,530,575 | 7/1985 | Yamakawa . | |
| 4,733,953 | 3/1988 | Yamamoto et al. . | |
| 4,758,074 | 7/1988 | Yamakawa . | |
| 4,767,199 | 8/1988 | Yamamoto et al. . | |
| 4,776,681 | 10/1988 | Moskovich . | |
| 4,778,264 | 10/1988 | Matsumura et al. . | |
| 4,792,218 | 12/1988 | Nakajima et al. . | |
| 4,801,196 | 1/1989 | Betensloy | 359/649 |
| 4,815,831 | 3/1989 | Betensky . | |
| 5,015,076 | 5/1991 | Ueda | 359/649 |

FOREIGN PATENT DOCUMENTS

| | | |
|---|---|---|
| 59-170812 | 9/1984 | Japan . |
| 59-17082 | 9/1984 | Japan . |
| 593514 | 10/1947 | United Kingdom . |
| 1269133 | 4/1972 | United Kingdom . |

OTHER PUBLICATIONS

Kingslake, R., *Lenses In Photography*, Garden City Books, 1951, pp. 131–132.

Smith, W., "Optical Materials and Coatings," *Modern Optical Engineering*, McGraw Hill, 1966, pp. 145–155.

*Primary Examiner*—Paul M. Dzierzynski
*Assistant Examiner*—James Phan
*Attorney, Agent, or Firm*—Maurice M. Klee

[57] ABSTRACT

A projection lens in which a lens unit which may comprise one or two elements is closely coupled at the object end of the lens to a cathode ray tube. At the image end is a lens unit of overall weak optical power which comprises from the image end a first positive element followed by a closely spaced negative element of substantially higher dispersion. Intermediate the object side lens unit and the image side lens unit is a lens unit of substantial optical power supplying substantially all of the positive optical power of the lens. Closely spaced to this power lens unit on the object side is a negative lens element of high dispersion. This negative lens element may be considered to be part of the power lens unit. The negative lens elements have weak optical power at the axis of the lens but are of generally increasing negative optical power from the optical axis to the clear apertures of the negative lens elements to contribute to proper color correction of the lens, particularly axial chromatic aberration adjacent the full aperture. The intermediate positive power lens unit may comprise one or two positive elements depending upon the application and the manner in which the power is to be distributed to minimize aberrations. A lens embodying the invention is capable of maintaining a high image quality over a large range of magnifications by moving the first and second lens units from the image end in predetermined differential relationship.

45 Claims, 2 Drawing Sheets

COLOR CORRECTED PROJECTION LENS

Matter enclosed in heavy brackets [ ] appears in the original patent but forms no part of this reissue specification; matter printed in italics indicates the additions made by reissue.

FIELD OF THE INVENTION

This invention relates to projection lenses for cathode ray tubes and, more particularly, relates to such lenses which are color corrected.

BACKGROUND OF THE INVENTION

In projection television systems it is a common practice to utilize three cathode ray tubes (CRT) of different colors, namely, red, blue and green. The images formed on each of these CRT's is projected onto a screen where the three separate images are combined to form a full color picture. Lenses used in this application can be generally characterized by a construction which includes a strong negative element in the vicinity of the CRT, a strong positive power component at some distance away from said negative element, and a weaker component furthest away from the CRT. Examples of such lenses are shown in U.S. Pat. Nos. 4,300,817; 4,348,081 and 4,526,442.

In practice, the phosphors used in CRT's do not emit strictly monochromatic light. The emission spectrum of the green CRT, in particular, has significant side bands in red and blue parts of the spectrum. If projection lenses are not corrected for color, this chromatic spread will result in a lower overall image contrast and in sometimes visible color fringing. Therefore, to achieve the image quality requirements of high end projectors, including data display, intermediate definition and high definition television (IDTV and HDTV) applications, it is desirable to provide some degree of correction for chromatic aberrations in the lens.

Examples of partially color corrected lenses are disclosed in U.S. Pat. Nos. 4,530,575; 4,733,953, 4,758,074; 4,778,264 and 4,815,831. Fully color corrected lenses for data display and high definition TV applications are shown in U.S. Pat. Nos. 4,767,199 and 4,792,218.

The requirement for partial or total color correction always complicates an optical design problem. To achieve some degree of control of chromatic aberrations a combination of elements of various dispersions and powers must be used. That, in turn, makes it more difficult to correct for monochromatic aberrations like spherical, coma, astigmatism, etc. In the end, a color corrected lens become more complex, with a larger number of elements, and is more expensive to manufacture than the lens with only monochromatic aberration correction. An increased number of elements also leads to higher losses in transmission and contrast. And, since the individual elements in these lenses are quite large in size, additional increases in weight of these lenses become significant.

Additionally, it is often desirable that lenses be capable of high performance levels over a significant range of magnifications. Ideally, in front projection application the same lens might be used over a range of magnifications from 10× to 60× without any degradation in image quality. This further complicates the optical design.

Focusing very fast f/1.0 lenses covering a wide field of view has always been difficult. It is desirable to be able to use the same lens. For example, the same front projector should be easily adaptable to various size auditoriums by simply refocusing the projection lenses without any loss in image quality, or the lens used on one model of the rear projector should be also usable on a wide variety of other models and sizes of rear projection TV sets when appropriately refocused.

The most common way of focusing projection TV lenses usually involves moving the whole lens along the optical axis. When the rear strong negative element is liquid coupled to the CRT, only the front portion of the lens is moved. This focusing technique works sufficiently well over a limited range of magnifications. Variations of spherical aberrations and astigmatism usually prevent the range to be extended substantially. When conjugates are changed significantly the lens must be partially or completely redesigned.

Accordingly, the present invention provides new and improved color corrected projection lenses for CRT's of high definition while maintaining a wide field of view and a large relative aperture. The invention also provides a CRT projection lens that is capable of maintaining a high level of image quality over a wide range of magnifications. The invention also provides a lens which achieves a good image and a high degree of stability of aberrations correction with shift of conjugates in a relatively simple configuration.

SUMMARY OF THE INVENTION

Briefly stated, the invention in one form thereof comprises a projection lens which includes from the long conjugate a first unit of two elements, one positive and one negative, having a weak combined power, a second lens unit providing most of the positive power of the lens and including at least one positive element followed by a negative element, and a third unit which includes a strong negative element in the vicinity of the CRT. Each of the negative elements in the first and the second units have at least one aspherical surface.

The longitudinal chromatic aberration or axial color is corrected by an appropriate combination of positive and negative elements with different dispersion characteristics. The better the correction, the stronger the powers of a positive and a negative elements must be, or the dispersion difference between these elements must be increased. By using two negative elements instead of one the power of each of these negative elements can be kept weak, with each of the first and the second units partially correcting for axial color. Any transverse blur in the image plane caused by the axial color is proportional to the square of the height of the axial marginal ray. The size of this aberration at smaller aperture heights is not significant enough to effect the performance of the lens. Only when the aperture becomes larger especially for f/1.0 lenses, does this aberration become important to correct. Therefore, aspherical surfaces can be used to shape the negative elements in such a way so that the correction of axial color is accomplished mainly for outlying portions of the aperture, that is, in the areas closer to the maximum clear apertures of the elements of the first and the second units of the lens. Consequently, the refractive power of these negative elements, while relatively weak on axis, gradually increases towards the outer portion of the elements. If the surfaces of these elements were spherical with corresponding base radii, the refractive power of the elements would not change across the diameter, and the correction of color would only be partial, and not sufficient to achieve a high performance level. If, however, the radii of these elements were made short enough to obtain an appropriate correction of chromatic aberrations, then additional elements would be needed to obtain an adequate correction of monochromatic aberrations and, also, satisfy the basic physical specifications of the lens such as focal length, field of view and relative aperture.

Having negative elements of relatively weak power also helps to keep the variation of thickness across the diameter of the element reasonably small, thus allowing for economical manufacture of these elements by molding them from out of an appropriate plastic material.

When the field of view of the lens is increased and the optical performance requirements are raised to higher levels, it is helpful to add another element between the second and third lens units. Placing an element with at least one aspherical surface in that location allows for better correction of sagittal oblique spherical aberrations and other residual offaxis aberrations.

A new focusing method involves moving the first and the second lens units along the optical axis in a predetermined fashion relative to each other. The third lens unit and a corrector, if any, remain fixed relative to the CRT. The motion of the first two units can be controlled by a cam or a double helocoid to achieve a simultaneous change in position of these two units. By focusing a lens in this fashion a very stable high quality optical performance can be achieved with a minimum number of elements.

In a preferred embodiment the strongest positive elements in the second lens unit are made out of glass to achieve some thermal stability, as described in the prior art. The rest of the elements are plastic. This allows for the most economical manufacturing of the aspherical elements. Because some of the plastic elements have positive power and some have negative power, and their thermo optic coefficients describing the change in the refractive index as a function of temperature are similar, it is also possible to improve the thermal stability of the lens even further by choosing appropriate powers for these elements.

An object of this invention is to provide a new an improved color corrected lens which has a fast relative aperture, covers a wide field of view and is simple and inexpensive to manufacture in large quantities.

Another object of this invention is to provide a novel focusing method for a projection TV lens which allows for the lens to achieve a great stability of image quality over a large range of magnifications.

The features of the invention which are believed to be novel are particularly pointed out and distinctly claimed in the concluding portion of this specification. The invention, however, together with further objects and advantages thereof may best be appreciated by reference to the following detailed description taken in conjunction with the drawing.

DETAILED DESCRIPTION OF PREFERRED EMBODIMENTS OF THE INVENTION

Figure 1:
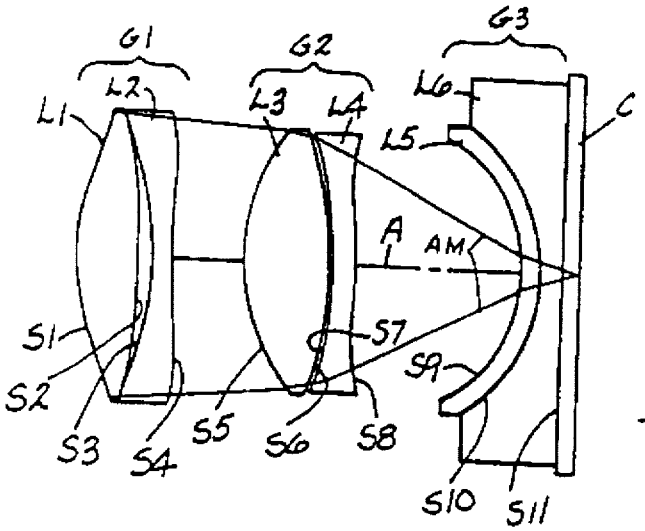
FIGS. 1, 2, 3 and 4 are schematic side elevations of lenses embodying the invention.

A first lens embodying the invention as illustrated in FIG. 1 comprises a first or front lens unit G1 comprised of elements L1 and L2. Lens element L1 is positive and is of a low dispersion material, similar to crown glass, such as acrylic and has at least one aspheric surface. Element L1 in lens unit G1 is closely followed by a negative lens element L2 having high dispersion characteristic of flint glass. The optical power at the axis of lens element L2 is very low as will hereinafter be made apparent, lens element L2 has at least one aspheric surface which changes in power towards the clear aperture thereof to provide correction for axial chromatic aberration. Lens element L1 also has an aspheric surface which changes in power towards the clear aperture thereof. The elements L1 and L2 cooperate in powers and dispersion in the vicinities of the clear apertures thereof to contribute to correction of axial chromatic aberration.

A second or another lens unit G2 comprises the major power element L3 of the lens of a material similar to crown type glass followed by a negative lens element L4 of high dispersion which is closely spaced thereto and in which the axial marginal rays AM intersect the lens at a height very close to the clear aperture to provide further correction for axial chromatic aberration.

A third or rear lens unit G3 comprises a lens element L5 and a housing member identified by the reference numeral L6 which contains a liquid coolant which is of a compatible index of refraction to lens element L5. The element L6 not only provides negative optical power to contribute to correction of field curvature but provides a coolant for the cathode ray tube C.

It will be noted that the axial marginal rays as denoted by the reference numeral AM intersect the elements L2 and L4 very close to the clear aperture thereof to provide correction for axial chromatic aberration.

In the lenses described the elements L2 and L4 (FIGS. 1, 2 and 4) and elements L2 and L5 (FIG. 3) are configured in the vicinity of the clear aperture to contribute to correction of axial color by the provision of at least one aspheric surface which changes the power of the elements in the vicinity of the clear apertures thereof with respect to the paraxial power.

A lens as shown in FIG. 1 is substantially described in Table I.

Figure 2:
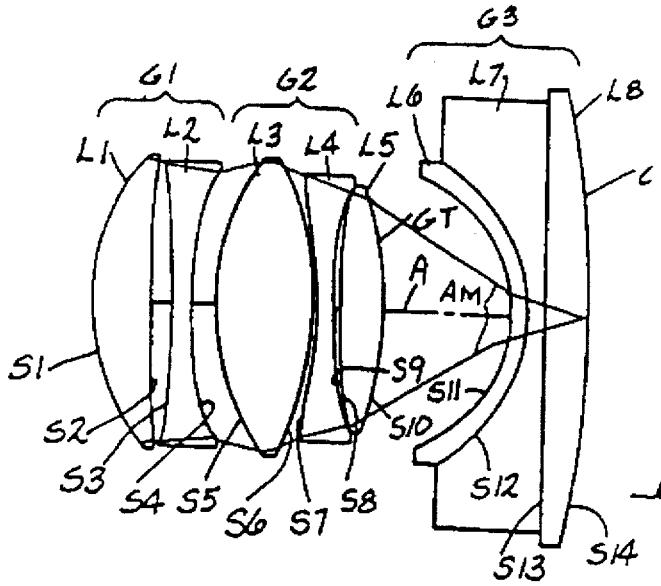

A lens embodying the invention, as shown in FIG. 2, is somewhat similar to the lens of FIG. 1 but it includes a corrector lens unit CT between the second lens unit G2 and lens unit G3. The lens shown in FIG. 2 comprises a lens unit G1 having a positive lens L1 and a negative lens L2 of much higher dispersion as measured by its Abbe number. Lens unit G2 comprises a optically strong unit L3 followed by a negative unit L4 having a very high dispersion providing color correction for axial chromatic aberrations adjacent the clear aperture thereof. Lens G2 is followed by a strongly concave negative lens unit G3 which comprises what may be considered a shell element L6 followed by an element which includes a liquid coupler L7 of appropriate refractive index between element L6 and a cathode ray tube. The cathode ray tube is curved on the phosphor side thereof to provide some optical power. In this regard since the interior surface of the CRT contributes optical power, it is included in the prescription in Table II for the lens shown in FIG. 2.

In the lens embodiments of FIGS. 1 and 2, the lens element L4 may be considered part of lens unit G2 inasmuch as in contributing to correction of axial chromatic color aberration it cooperates with element L3. It will be noted that the axial marginal rays AM in the embodiment shown in FIG. 2 strike the element L4 closely adjacent the clear aperture thereof where it is of strongest power and together with the preceding positive element contributes to correction of axial chromatic aberration. The axial marginal rays as shown in FIG. 2 strike the corrector element CT at slightly less than the clear aperture thereof so as to help to contribute to aperture dependent aberrations but leave some room at the outer edges thereof to contribute to correction of off axis aberrations such as sagittal oblique spherical aberrations.

A lens as shown in FIG. 2 is substantially described in Table II.

Figure 3:
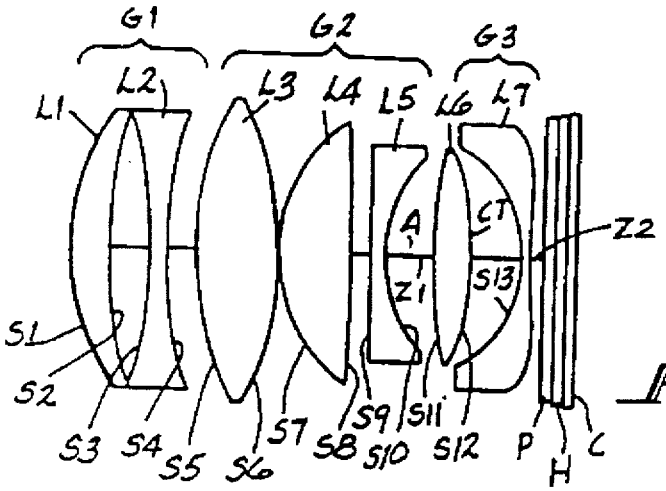

The lens of FIG. 3 is primarily designed for front projection and has a longer equivalent focal length as set forth in Table III. The lens of FIG. 3 comprises a first lens unit G1 which comprises a positive element followed by a closely spaced negative element of very high dispersion to contribute correction of axial chromatic aberration particularly at the outer edges thereof. The second lens unit G2 comprises two positive elements L3 and L4 followed by a negative lens unit L5 which also provides at its outer edges thereof in conjunction with element L4 correction for axial chromatic aberration. Element L5 has at least one aspheric surface, and the absolute power of the lens increases from the axis thereof toward the clear aperture due to this aspheric surface.

The third lens unit G3 comprises an element L7 which is closely coupled to a cathode ray tube C. In this embodiment there is an X-Ray absorbing plate P and in between a housing H which holds a cooling liquid between the cathode ray tube C and the X-Ray absorbing plate P.

Additionally, a corrector lens unit CT having at least one aspheric surface is positioned between the second lens unit G2 the third lens unit G3.

This corrector lens unit aids in correction of aperture dependent aberrations towards the central area thereof while providing correction for off axis aberration at the outer edges thereof.

The embodiment of FIG. 3 may be considered to be air coupled to the CRT while the embodiments of FIGS. 1 and 2 are optically coupled to the CRT in view of the liquid containing housing units designated by the lens L6 in FIG. 1 and L7 in FIG. 2.

A lens as shown in FIG. 3 is substantially described in Table III.

Figure 4:
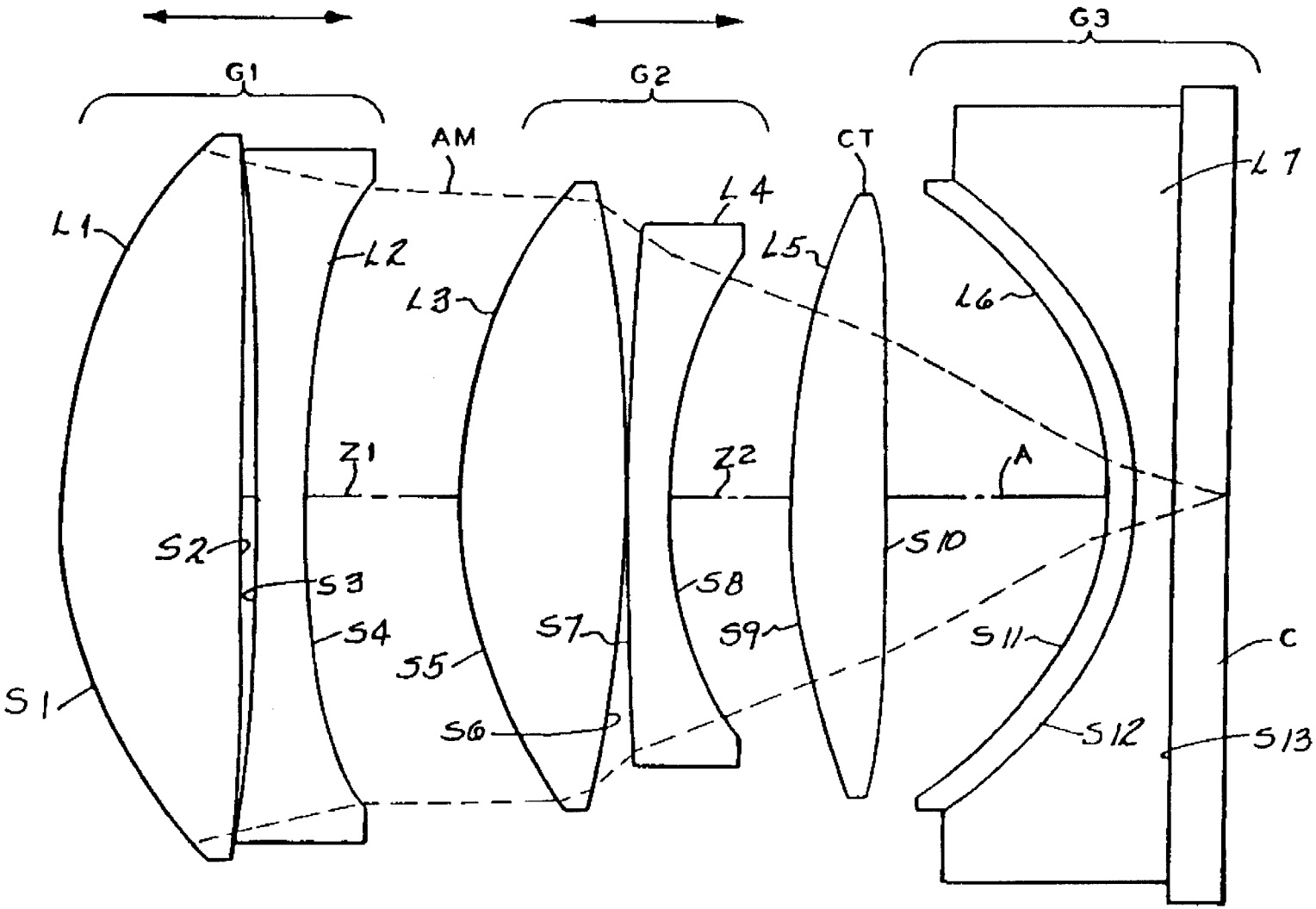

Lenses as shown in FIG. 4 have a similar configuration to the lens of FIG. 2, but are adapted for a large range of magnifications as well hereinafter be described.

Two lenses as shown in FIG. 4 are substantially described in Tables IV and V.

In the lens of FIG. 1, at least one surface of element L1 as well as the difference in dispersion of the cooperating positive element is configured to cooperate with element L2 in the vicinity of the clear aperture to contribute to correction of axial chromatic aberration. This is also true in all other examples.

Axial longitudinal chromatic aberration adjacent the clear aperture of the lens elements is corrected by the combination of the positive and negative elements of the lens units G1 and also the positive and negative elements of the lens unit G2.

It will depend upon the decision of the TV manufacturer as to whether it wishes to have an optically coupled lens as shown in FIGS. 1, 2 and 4 or an air coupled lens as shown in FIG. 3.

In the disclosed embodiment of the invention, lens elements have aspheric surfaces defined by the equation $$x = \frac{Cy^2 +}{1 + \sqrt{1 - (1 + K)C^2y^2}} Dy^4 + Ey^6 + Fy^8 + Gy^{10} + Hy^{12} + Iy^{14}$$

where x is the surface sag at a semi-aperture distance y from the axis A for the lens, C is the curvature of the lens surface at the optical axis, K is a conic constant, and D, E, F, G, H and I are aspheric coefficients of correspondingly fourth through fourteenth order in even expotential powers.

In the following tables, the lens elements are identified from the image end to object end by the reference L followed by successive Arabic numerals. Lens surfaces are identified by the reference S followed by successive Arabic numerals from the image to the object end. Positive radii are struck from the right and negative radii from the left. The index of refraction of each element is given under the heading Ne. The dispersion of each lens element as measured by its Abbe number is given by Ve.

The index of refraction given by the symbol Ne represents the green mercury line and the dispersion Ve is also to the green mercury line. Other parameters of disclosed lenses embodying the invention are also set forth in Tables I–V, and the following tables.

TABLE I

| LENS | | SURFACE RADIUS (mm) | AXIAL DISTANCE BETWEEN SURFACES (mm) | $N_e$ | $V_e$ |
|---|---|---|---|---|---|
| | S1 | 79.7613 | | | |
| L1 | | | 20.0000 | 1.49354 | 57.34 |
| | S2 | −669.9136 | 4.6902 | | |
| | S3 | −116.8472 | | | |
| L2 | | | 7.0000 | 1.59495 | 30.70 |
| | S4 | 1056.4020 | | | |
| | | | 23.6442 | | |
| | S5 | 70.9138 | | | |
| L3 | | | 28.0000 | 1.64128 | 55.19 |
| | S6 | −124.5127 | | | |
| | | | .5000 | | |
| | S7 | −105.1656 | | | |
| L4 | | | 8.2300 | 1.59495 | 30.70 |
| | S8 | −269.9804 | | | |
| | | | 55.3717 | | |
| | S9 | −59.4288 | | | |
| L5 | | | 3.7500 | 1.49354 | 57.34 |
| | S10 | −58.0000 | | | |
| L6 | | | 8.0000 | 1.42900 | 50.00 |
| | S11 | plano | | | |
| L7 | | | 5.7500 | 1.53700 | 50.00 |

TABLE I-continued

| | | | |
|---|---|---|---|
| S12 | plano | | −.0002 |

ASPHERICAL SURFACE DATA:

| S | D | E | F | G | H | I |
|---|---|---|---|---|---|---|
| S1 | −.42555E-06 | −.49543E-09 | .26480E-12 | −.20345E-15 | .61635E-19 | −.12486E-22 |
| S2 | −.52887E-06 | −.23095E-09 | .60365E-13 | .66225E-16 | −.54544E-19 | .11586E-22 |
| S4 | −.22688E-07 | .18679E-10 | −.52303E-13 | −.20711E-16 | .90800E-20 | −.15468E-23 |
| S7 | −.20618E-06 | .78774E-09 | −.42344E-12 | .11201E-15 | −.24723E-19 | .39342E-23 |
| S8 | .77243E-06 | .68520E-09 | −.21054E-13 | −.15621E-15 | .54388E-19 | −.70704E-23 |
| S9 | −.19224E-05 | .10054E-09 | −.51595E-13 | .70329E-16 | .51214E-19 | −.42912E-22 |

EFL = 99.0 mm
f/NO = 1.10 as infinity

TABLE II

| LENS | | SURFACE RADIUS (mm) | AXIAL DISTANCE BETWEEN SURFACES (mm) | $N_e$ | $V_e$ |
|---|---|---|---|---|---|
| | S1 | 74.2416 | | | |
| L1 | | | 17.5000 | 1.49354 | 57.34 |
| | S2 | 1890.7290 | | | |
| | | | 6.3993 | | |
| | S3 | −353.7105 | | | |
| L2 | | | 6.0000 | 1.59495 | 30.70 |
| | S4 | 168.5545 | | | |
| | | | 7.9750 | | |
| | S5 | 76.7012 | | | |
| L3 | | | 29.5000 | 1.59142 | 61.03 |
| | S6 | −102.6833 | | | |
| | | | .4500 | | |
| | S7 | −140.5109 | | | |
| L4 | | | 6.0000 | 1.59495 | 30.70 |
| | S8 | 2405.5770 | | | |
| | | | 1.8204 | | |
| | S9 | 3614.1540 | | | |
| L5 | | | 13.0000 | 1.49354 | 57.34 |
| | S10 | −107.5106 | | | |
| | | | Z1 | | |
| | S11 | −54.2507 | | | |
| L6 | | | 5.0000 | 1.49354 | 57.34 |
| L7 | | | 5.0000 | 1.43300 | 50.00 |
| | S13 | plano | | | |
| L8 | | | 13.1000 | 1.56600 | 50.00 |
| | S14 | −350.0000 | | | |
| | | | −.0007 | | |

ASPHERICAL SURFACE DATA:

| S | D | E | F | G | H | I |
|---|---|---|---|---|---|---|
| S1 | −.30278E-06 | −.39696E-09 | .65578E-12 | −.54355E-15 | .22972E-18 | −45485E-22 |
| S2 | .50238E-06 | .29645E-09 | −.19419E-12 | .15207E-15 | −.14647E-18 | .35404E-22 |
| S3 | .33721E-06 | −.11255E-09 | −.67345E-13 | −.23116E-16 | −.57597E-20 | .59609E-23 |
| S4 | .45051E-06 | −.39788E-11 | .15672E-12 | .44925E-16 | .36143E-19 | −.11782E-22 |
| S7 | −.17777E-06 | .14069E-08 | −.77347E-12 | .29025E-15 | −.69186E-19 | .35744E-23 |
| S8 | .13689E-05 | .13175E-08 | −.50402E-12 | −.19391E-15 | .35271E-18 | −.53285E-22 |
| S9 | .16754E-05 | −.39851E-09 | .28977E-12 | −.29520E-15 | .20386E-18 | .44467E-22 |
| S10 | .33475E-06 | −.16086E-09 | .11848E-12 | −.60788E-16 | −.66995E-19 | .82337E-22 |
| S11 | .61205E-05 | .53626E-08 | −.35544E-11 | .63970E-15 | .29820E-18 | −10191E-21 |

EFL = 89.4 mm
f/NO = 1.0 at infinity

TABLE III

| LENS | | SURFACE RADIUS (mm) | AXIAL DISTANCE BETWEEN SURFACES (mm) | $N_e$ | $V_e$ |
|---|---|---|---|---|---|
| | S1 | 118.0413 | | | |
| L1 | | | 19.0000 | 1.49354 | 57.34 |
| | S2 | 279.5864 | | | |
| | | | 20.1020 | | |
| | S3 | −270.8739 | | | |
| L2 | | | 9.0000 | 1.59495 | 30.70 |
| | S4 | 270.8739 | | | |

TABLE III-continued

| | | | | | |
|---|---|---|---|---|---|
| | | | 14.9593 | | |
| | S5 | 171.0173 | | | |
| L3 | | | 40.5796 | 1.51872 | 64.02 |
| | S6 | −171.0173 | | | |
| | | | .2000 | | |
| | S7 | 83.7713 | | | |
| L4 | | | 35.6330 | 1.51872 | 64.02 |
| | S8 | −1328.3410 | | | |
| | | | 9.9750 | | |
| | S9 | 2057.5210 | | | |
| L5 | | | 8.0000 | 1.59495 | 30.70 |
| | S10 | 85.7104 | | | |
| | | | Z1 | | |
| | S11 | 257.6417 | | | |
| L6 | | | 19.0000 | 1.49354 | 57.34 |
| | S12 | −178.9754 | | | |
| | | | 25.2767 | | |
| | S13 | −69.6645 | | | |
| L7 | | | 5.0000 | 1.49354 | 57.34 |
| | S14 | 466.9425 | | | |
| | | | Z2 | | |
| | S15 | plano | | | |
| L8 | | | 6.5000 | 1.53700 | 50.00 |
| | S16 | plano | | | |
| L9 | | | 4.8100 | 1.42000 | 50.00 |
| L10 | | | 5.7500 | 1.57200 | 50.00 |
| | S18 | plano | | | |
| | | | .0024 | | |

ASPHERICAL SURFACE DATA:

| S | D | E | F | G | H | I |
|---|---|---|---|---|---|---|
| S1 | −.11621E-06 | −.49544E-10 | .18681E-13 | −.67047E-17 | .11303E-20 | −.69308E-25 |
| S2 | .38060E-08 | −.62373E-11 | −.25648E-14 | .27436E-17 | −.54489E-21 | .69514E-25 |
| S3 | −.32858E-07 | −.47960E-11 | −.16998E-15 | .21168E-18 | .19367E-22 | −.78372E-26 |
| S4 | .32858E-07 | .47960E-11 | .16998E-15 | −.21168E-18 | −.19367E-22 | .78372E-26 |
| S9 | −.18988E-06 | .79851E-10 | −.28921E-13 | .54158E-17 | −.50610E-21 | −72986E-27 |
| S10 | .11973E-06 | .15072E-09 | −.23489E-13 | .81292E-17 | .23668E-20 | −.55905E-24 |
| S11 | 51476E-07 | .13917E-10 | −.21354E-13 | .96526E-18 | 24004E-20 | −.85472E-24 |
| S12 | .30763E-06 | −.82701E-10 | −.79401E-14 | .40372E-17 | −.55063E-22 | −.11513E-23 |
| S13 | .16025E-06 | −.33837E-09 | .82317E-13 | .33406E-16 | −.16682E-19 | .23473E-24 |
| S14 | −.47493E-06 | −.77318E-10 | .29802E-13 | −.57967E-17 | .25949E-21 | −.40005E-25 |

EFL = 139.4 mm
f/No = 1.0 at infinity

In the [following] *foregoing* Tables I–III the conic constant K is 1.3258.

TABLE IV

| LENS | | SURFACE RADIUS (mm) | AXIAL DISTANCE BETWEEN SURFACES (mm) | $N_e$ | $V_e$ |
|---|---|---|---|---|---|
| | S1 | 93.9194 | | | |
| L1 | | | 33.5000 | 1.49354 | 57.34 |
| | S2 | 658.9023 | | | |
| | | | 3.5151 | | |
| | S3 | −548.1886 | | | |
| L2 | | | 9.0000 | 1.59495 | 30.70 |
| | S4 | 287.3305 | | | |
| | | | Z1 | | |
| | S5 | 93.2579 | | | |
| L3 | | | 31.0000 | 1.64128 | 55.19 |
| | S6 | −267.6059 | | | |
| | | | .2000 | | |
| | S7 | 418.1418 | | | |
| L4 | | | 8.0000 | 1.59495 | 30.70 |
| | S8 | 93.2263 | | | |
| | | | Z2 | | |
| | S9 | 158.2390 | | | |
| L5 | | | 18.0000 | 1.49354 | 57.34 |
| | S10 | −1011.3090 | | | |
| | | | 40.8304 | | |
| | S11 | −59.1138 | | | |
| L6 | | | 5.0000 | 1.49354 | 57.34 |

TABLE IV-continued

| | | | | | |
|---|---|---|---|---|---|
| | S12 | −66.5000 | | | |
| L7 | | | 7.0000 | 1.43900 | 55.00 |
| | S13 | plano | | | |
| L8 | | | 10.3000 | 1.53700 | 50.00 |
| | S14 | plano | | | |
| | | | −.0004 | | |

ASPHERICAL SURFACE DATA:

| S | D | E | F | G | H | I |
|---|---|---|---|---|---|---|
| S2 | −.23232E-06 | .42953E-11 | .22237E-14 | .28556E-17 | −.10121E-20 | .55278E-25 |
| S3 | .29504E-07 | .85467E-11 | .52630E-15 | −.51414E-18 | −.11801E-21 | −.28899E-26 |
| S4 | .43027E-06 | .29611E-10 | .28426E-14 | −.27848E-17 | .33655E-21 | .24211E-25 |
| S7 | −.16002E-06 | .92877E-10 | −.36095E-13 | .55299E-17 | −.40886E-21 | −.49637E-25 |
| S8 | .12375E-06 | .17993E-09 | −.43680E-13 | .72048E-17 | .38525E-20 | −.90356E-24 |
| S9 | .21084E-06 | −.50871E-10 | .26661E-13 | −.88729E-17 | .10243E-20 | .16196E-25 |
| S10 | .66547E-07 | .76684E-12 | −.33818E-13 | .34535E-17 | .92518E-21 | |
| | | | | | −.30429E-24 | |
| S11 | −.20945E-06 | −.10691E-09 | .16506E-12 | .83919E-18 | −.23434E-19 | .57245E-23 |

TABLE V

| LENS | | SURFACE RADIUS (mm) | AXIAL DISTANCE BETWEEN SURFACES (mm) | $N_e$ | $V_e$ |
|---|---|---|---|---|---|
| | S1 | 79.2080 | | | |
| L1 | | | 26.0000 | 1.49354 | 57.34 |
| | S2 | 620.7167 | | | |
| | | | 6.2518 | | |
| | S3 | −187.0779 | | | |
| L2 | | | 8.0000 | 1.59495 | 30.70 |
| | S4 | 863.5535 | | | |
| | | | Z1 | | |
| | S5 | 87.2949 | | | |
| L3 | | | 25.5000 | 1.64128 | 55.19 |
| | S6 | −198.4495 | | | |
| | | | .2000 | | |
| | S7 | 864.7596 | | | |
| L4 | | | 8.0000 | 1.59495 | 30.70 |
| | S8 | 100.0126 | | | |
| | | | Z2 | | |
| | S9 | 164.8389 | | | |
| L5 | | | 14.0000 | 1.49354 | 57.34 |
| | S10 | −543.7059 | | | |
| | | | 43.8086 | | |
| | S11 | −53.9053 | | | |
| L6 | | | 4.0000 | 1.49354 | 57.34 |
| | S12 | −61.0000 | | | |
| L7 | | | 8.7000 | 1.43900 | 55.00 |
| | S13 | | | | |
| L8 | | | 6.5000 | 1.53900 | 59.00 |
| | S14 | | | | |
| | | | −.0003 | | |

ASPHERICAL SURFACE DATA:

| S | D | E | F | G | H | I |
|---|---|---|---|---|---|---|
| S1 | .37138E-07 | −.26219E-10 | .23371E-13 | −.40549E-17 | −.57581E-21 | .37161E-24 |
| S2 | −.28674E-06 | .30963E-10 | .14473E-13 | .16963E-16 | −.84215E-20 | .36035E-24 |
| S3 | .42304E-06 | .66225E-10 | −.89951E-14 | −.61368E-17 | −.12988E-20 | 14200E-24 |
| S4 | .10031E-05 | .83141E-10 | .28007E-13 | −.20575E-16 | .44543E-20 | .27305E-23 |
| S7 | −.63512E-07 | .15646E-09 | −.87382E-13 | .30696E-16 | −.93757E-20 | .11178E-23 |
| S8 | .31335E-06 | .25228E-09 | −.77793E-13 | .41139E-16 | −.99160E-20 | .16425E-23 |
| S9 | .23544E-06 | −.11740E-09 | .53503E-13 | −.34734E-16 | .26122E-21 | .45851E-23 |
| S10 | .15690E-06 | −.11252E-09 | .26590E-13 | −.27785E-16 | −.65235E-20 | .71119E-23 |
| S11 | −.11893E-05 | .58553E-09 | .29907E-13 | −.25989E-16 | −.22814E-19 | .13396E-22 |

The conic constant K in Tables IV and V is zero.

The following Table VI is set forth, for purposes of example only, to show the change in power of the high dispersion negative elements and the change in power due to aspheric surfaces adjacent to or in the vicinity of the clear aperture to contribute to correction of axial chromatic aberration.

In Table VI the quantity $K_A$ is the ratio of the power of the element at the optical axis of the lens to the power of the overall lens. The quantity $K_C$ is the ratio of the power of the lens element at the clear aperture to the power of the overall lens. The power of the lenses of Tables III-IV is at the shortest EFL.

It will be noted that in the examples of Tables II-V the power increases substantially from the optical axis denoted as $K_A$ to the clear aperture $K_C$. In the example of FIG. 1 and Table I, the first element L1 goes from positive power at the optical axis A to lesser power at the clear aperture, while the second element L2 changes in power to a lesser value.

The power of a lens at any height from the optical axis, is calculated by the equation:

$$K=(n-1)\left[C_1-C_2+t\frac{(n-1)}{n}C_1C_2\right]$$

where

K is the power of the element at the optical axis or at a given height from the optical axis;

n is the index of refraction;

$C_1$ is the local curvature of one surface of the lens element at a given height;

$C_2$ is the curvature of the other surface of the lens element at the same given height, and t is the axial thickness of the lens element.

TABLE VI

| | L1 | L2 | L4 | L5 |
|---|---|---|---|---|
| Table I | .755 | −.562 | −.339 | |
| $K_A$ | | | | |
| $K_C$ | .667 | −.249 | −1.636 | |
| Table II | | | | |
| $K_A$ | .573 | −.466 | −.399 | |
| $K_C$ | 2.386 | −3.556 | −2.827 | |
| Table III | | | | |
| $K_A$ | .35 | −.615 | | −.926 |
| $K_C$ | .38 | −1.488 | | −2.061 |
| Table IV | | | | |
| $K_A$ | .634 | −.437 | −.679 | |
| $K_C$ | 2.253 | −5.464 | −1.833 | |
| Table V | | | | |
| $K_A$ | .628 | −.442 | −.596 | |
| $K_C$ | 1.467 | −3.469 | −1.503 | |

The correction of axial chromatic aberration through the use of a combination of positive or negative components can be obtained in accordance with the following relationship.

$$\frac{K}{V}=\frac{K_1}{V_1}+\frac{K_2}{V_2}$$

where $K_1$ and $K_2$ are the powers of the elements L1 and L2 respectively, $V_1$ and $V_2$ are the dispersions of elements L1 and L2 respectively, K is the combined power of elements L1 and L2, and V is the effective Abbe value of the combined elements.

For complete correction of axial chromatic aberration V is infinity and $$\frac{K_1}{V_1}=-\frac{K_2}{V_2}$$

The foregoing exemplifies the considerations of the powers and dispersions of cooperating positive and negative elements.

In the examples of Tables II-V, the power of the positive element L1 of the first lens unit G1 increases toward the clear aperture, while the negative power of element L2 increases in absolute value, both increases due to the aspheric surfaces thereof.

In the second lens units G2 of all examples only the negative element changes in power from the optical axis to the clear aperture due to aspheric surfaces, since the positive elements of lens unit G2 are spherical. However, if desired an aspheric surfaces(s) could be provided on a power element L3 (or L4 in Table III).

In all embodiments the negative element of a positive negative combination changes in power in such a way from the optical axis to the clear aperture with respect to the power of the preceding positive element(s) to contribute to obtaining a favorable correction of axial chromatic aberration in the vicinity of the clear aperture.

As will be seen from FIG. 1 and Table I, this relationship may be satisfied by making element L1 go less positive adjacent the clear aperture and consequently L2 goes less negative. The elements L1 and L2 are plastic and may economically have aspheric surface(s) defined thereon to achieve this effect.

In the examples in Tables II-V contribution to axial color correction is achieved primarily by aspheric surfaces on the cooperating high dispersion negative elements L4 which increase in negative power with aperture height, in conjunction with the corresponding power of the proceeding positive element.

In all examples contribution to correction of axial chromatic aberration is also made by the combination of the power of elements and the following negative element L4 (L5 in Table III) through high dispersion and related power in regard to the proceeding positive power element(s) in the vicinity of the clear apertures.

What is stated for the values of K/V with regard to FIG. 1 and Table I is equally valid with respect to the other examples, as well as the cooperating positive and negative elements of lens unit G2 of all examples.

A lens as shown in FIG. 3 will provide an image quality of up to ten cycles/mm (MTF) at an image height of almost two hundred seventy inches at a substantially same throw distance. This lens is designed for front projection and gives excellent image quality for data display and large magnifications. This lens is designed to be focused by movement of L1-L5, and L6, L7 deferentially for throw distances of approximately six and one-half feet to twenty-two and one-half feet while maintaining good image quality. The EFL of the lens may vary with focusing from 139.4 mm to 140.9 mm.

The focusing travel of the focusing lens units in FIG. 3 is set forth in the following Table VII.

TABLE VII

| EFL (mm) | Z1 (mm) | Z2 (mm) |
|---|---|---|
| 140.2 | 19.81 | 4.16 |
| 140.9 | 17.44 | 3.00 |
| 139.4 | 22.71 | 5.99 |

As will be seen from the foregoing data, lens units G1 and G2 move in fixed relation while elements L6, L7 move in fixed relation, but differentially with respect to lens units G1 and G2.

The lens of FIGS. 1 and 2 are designed for back projection TV sets and may be variable in focus by positioning lens units G1 and G2 with respect to lens unit G3 dependent upon the specifications of TV manufacturers for the size of the viewing screen. The lenses of FIGS. 1 and 2 and Tables I and II respectively, are designed for and give good optical performance out to five cycles/mm (MTF).

The lenses of FIG. 4 and Tables IV and V are designed for variable focusing and permit lens units G1 and G2 to differentially move to achieve variable focusing. Table VIII sets forth the movements of the lens units G1 and G2 for various EFL's and magnifications M.

TABLE VIII

Table IV

| EFL (mm) | Z1 (mm) | Z2 (mm) | M |
|---|---|---|---|
| 138.0 | 26.25 | 28.88 | −.076 |
| 140.4 | 29.10 | 22.56 | −.044 |
| 142.3 | 31.37 | 17.93 | −.021 |

Table V

| EFL (mm) | F1 (mm) | F2 (mm) | M |
|---|---|---|---|
| 113.8 | 18.98 | 22.09 | −.122 |
| 114.9 | 20.50 | 19.04 | −.104 |
| 117.8 | 24.81 | 10.79 | −.056 |

The lens of Table IV provides an excellent MTF out to twelve cycles per millimeter and the lens of Table IV provides an excellent MTF of ten cycles per millimeter at focus. Both are well balanced in aberration correction, both monochromatic as well as chromatic.

The powers of the lens units as a ratio to the power of the overall lens are set forth in the following Table IX:

TABLE IX

| | $K_1/K_0$ | $K_2/K_0$ | $K_3/K_0$ | T/fo |
|---|---|---|---|---|
| Table I | .185 | 1.030 | −.708 | .239 |
| Table II | .168 | .79 | −.543 | .089 |
| Table III | −.198 | 1.205 | −.878 | .107 |
| Table IV | .267 | 1.212 | −1.145 | .187 |
| Table V | .255 | .676 | −.946 | .165 |

where $K_1$, $K_2$, $K_3$ are the powers of lens units G1, G2 and G3, respectively, and $K_0$ is the power of the overall lens, $f_0$ is the focal length of the lens and T is the spacing between lens units G1 and G2.

The first lens unit G1 is of small optical power and may be either positive or negative. The spacing T/fo is less than 0.4.

It may thus be seen that the objects of the invention set forth, as well as those made apparent from the foregoing description, are efficiently attained. While preferred embodiments of the invention have been set forth for purposes of disclosure, modification to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

What is claimed is:

1. A projection lens for a cathode ray tube comprising a rear lens unit [adopted] *adapted* to be closely coupled to a cathode ray tube at the object end thereof, said lens unit having a strongly concave image side surface, a front lens unit on the image side of said lens [comprising] *consisting of* a positive image side element having a dispersion similar to the dispersion of crown glass followed by a closely spaced negative element of high dispersion similar to the dispersion of flint glass, and another lens unit providing substantially all of the positive optical power of said lens intermediate said front and rear lens units, said another lens unit including a negative element of high dispersion similar to the dispersion of flint glass on the object side thereof.

2. The lens of claim 1 where said another lens unit comprises two positive elements both having spherical surfaces.

3. The lens of claim 1 further including a corrector lens unit of weak optical power having at least one aspherical surface positioned between said rear lens unit and said another lens unit so that the axial marginal rays from the long conjugate side of said lens intersect said corrector lens unit below the clear aperture thereof.

4. The lens of claim 3 where said front lens unit and said another lens unit move in fixed relation and said rear lens unit together with said corrector lens unit move in fixed relation but differentially with respect to said front lens unit and said another lens unit to vary the focal length of said lens.

5. The lens of claim 1 where the absolute value of the optical power of said negative lens element of said front lens unit increases from the optical axis to the clear aperture thereof due to at least one aspheric surface thereof.

6. The lens of claim 1 where said lens elements of said front lens unit contribute to correction of axial chromatic aberration adjacent the clear aperture thereof.

7. The lens of claim 1 where the elements of said another lens unit contribute to correction of axial chromatic aberration adjacent the clear apertures thereof.

8. The lens of claim 1 where said negative lens element of said front lens unit changes in optical power with height from the optical axis of the lens to contribute to correction of axial chromatic aberration in combination with the power of the preceding positive element of said front lens group.

9. The lens of claim 1 where said front lens unit and said another lens unit move in the same direction but at differential rates to vary the focal length of said lens.

10. A projection lens for a cathode ray tube comprising from the image end, a first positive lens element having at least one aspheric surface followed closely by a second negative lens element of high dispersion having at least one aspheric surface, a third strongly positive lens element followed by a fourth negative lens element having at least one aspheric surface, and a fifth negative lens unit having a strongly concave image side surface and adapted to be closely coupled to a cathode ray tube.

11. The lens of claim 10 further including another positive lens element closely adjacent said third lens element on the image side of said third lens element.

12. The lens of claim 10 further including a corrector lens unit of weak optical power having at least one aspherical surface positioned between said fourth lens element and said fifth negative lens unit so that the axial marginal rays from the long conjugate side of said lens intersect said corrector lens element below the clear aperture thereof.

13. The lens of claim 10 where the absolute value of the optical power of said second negative lens element increases from the optical axis to the clear aperture thereof due to said at least one aspheric surface thereof.

14. The lens of claim 10 where said first and second lens elements contribute to correction of axial chromatic aberration adjacent the clear apertures thereof.

15. The lens of claim 10 where said third and fourth lens elements contribute to correction of axial chromatic aberration adjacent the clear apertures thereof.

16. The lens of claim 10 where said negative lens elements change in absolute optical power with height from the axis of the lens to the clear aperture thereof due to the aspheric surfaces on each element.

17. A projection lens for a cathode ray tube comprising a first positive element having at least one aspheric surface, a second negative lens element closely spaced to said first element having at least one aspheric surface and being of stronger absolute optical power adjacent the clear aperture thereof than at the optical axis, said second element having a high dispersion similar to the dispersion of flint glass, said first lens element having a dispersion similar to the dispersion of crown glass, a third strongly positive lens element having a dispersion similar to the dispersion of crown glass, a fourth negative lens element closely spaced to said third lens element having a dispersion similar to the dispersion of flint glass, said fourth lens element having at least one aspheric surface which increases in absolute optical power from the optical axis to the clear aperture thereof, and a lens unit having a strongly concave image side surface adapted to be closely coupled to a cathode ray tube.

18. The lens of claim 17 further including another positive lens elements on the image side of said third lens element and closely spaced thereto.

19. The lens of claim 17 further including a corrector lens element of weak optical power having at least one aspheric surface positioned between said fourth lens element and said lens unit such that the axial marginal rays from the long conjugate side of said lens interact said corrector lens element below the clear aperture thereof.

20. The lens of claim 17 where said lens first and second elements contribute to correction of axial chromatic aberration adjacent the clear apertures thereof.

21. The lens of claim 17 where said third and fourth elements contribute to correction of axial chromatic aberration adjacent the clear apertures thereof.

22. The lens of claim 17 where said second and fourth negative lens elements change in absolute optical power with height from the axis of the lens to the clear aperture thereof due to at least one aspheric surface on each element.

23. A projection lens for a cathode ray tube comprising from the long conjugate side a first lens unit of weak power, including a positive element followed by a closely spaced negative element having at least one aspherical surface and made out of material with higher dispersion than said positive element; a second lens unit providing most of the positive power of the lens and including at least one positive element followed by a closely spaced negative element having higher dispersion than the preceding positive element; and a third lens unit of negative power and including a strong negative element in the vicinity of a cathode ray tube.

24. The lens of claim 23 where said second lens unit comprises two positive elements.

25. The lens of claim 23 further including a corrector lens element positioned between said second and said third lens units, said corrector element having at least one aspherical surface.

26. The lens of claim 23 where the optical power of the negative lens element in said first lens unit changes from the optical axis to the clear aperture thereof.

27. The lens of claim 23 where the optical power of the negative lens element in said second lens unit gradually changes from the optical axis to the clear aperture thereof.

28. The lens of claim 23 where said positive and negative lens elements of said first and second units contribute to correction of axial chromatic aberration adjacent the clear aperture thereof.

29. A projection lens for a cathode ray tube comprising from the long conjugate a first positive lens element having at least one aspherical surface followed closely by a second negative lens element of high dispersion having at least one aspherical surface, a third strongly positive lens element followed by a fourth negative lens element of high dispersion having at least one aspherical surface, and a fifth strongly negative lens component having a strongly concave image side surface.

30. The lens of claim 29 further including another positive lens element closely adjacent said third lens element.

31. The lens of claim 29 further including a corrector lens element having at least one aspherical surface positioned between said fourth lens element and said fifth strongly negative component adjacent to a cathode ray tube so that the axial marginal rays from the long conjugate side of said lens intersect said corrector lens element below the clear aperture thereof.

32. The lens of claim 29 where said negative lens elements change in power with height from the axis of the lens to the clear aperture thereof due to at least one aspherical surface on each element.

33. The lens of claim 29 where said first and second elements contribute to correction of longitudinal chromatic aberration.

34. The lens of claim 29 where said third and fourth elements contribute to correction of longitudinal chromatic aberration.

35. A projection lens for a cathode ray tube comprising a first positive element having at least one aspheric surface, a second negative lens element closely spaced to said first element and having at least one aspheric surface and being of stronger absolute power adjacent the clear aperture thereof than at the optical axis, said second element having a high dispersion similar to the dispersion of flint glass, said first lens element having a dispersion similar to the dispersion of crown glass, a third strongly positive element with a dispersion similar to the dispersion of crown glass, a fourth negative lens element closely spaced to said third lens element having a dispersion similar to the dispersion of flint glass, said fourth lens element having at least one aspherical surface and being of stronger absolute power adjacent the clear aperture thereof than at the optical axis, and a fifth negative lens having a strongly concave surface facing the long conjugate side and adapted to be closely coupled to a cathode ray tube.

36. The lens of claim 35 further including another positive lens element on the long conjugate side of the third lens element and closely spaced thereto.

37. The lens of claim 35 further including a corrector lens element having at least one aspheric surface positioned between said fourth lens element and said fifth lens.

38. A projection lens for a cathode ray tube comprising from the long conjugate a first unit of a weak power and including at least one positive element of low dispersion and one negative element of high dispersion and having at least one aspherical surface; a second lens unit providing most of the positive power of the lens and including at least one positive element of low dispersion and one negative element of high dispersion, a third lens unit of strong negative power adapted to be closely coupled to a cathode ray tube, said lens being capable of changing magnifications by moving said first and said second lens units along the optical axis in a predetermined manner relative to each other while keeping said third unit stationary relative to a cathode ray tube.

39. The lens of claim 38 further including a corrector lens unit having at least one aspherical surface and positioned between said second and said third lens units, said corrector lens unit being kept stationary with respect to said third unit while said first and second lens units are moved to change magnification.

40. The lens of claim 38 where said negative elements in said first and second lens units change in power with height from the axis of the lens to the clear aperture thereof to contribute to correction of axial chromatic aberration in combination with the power of the preceding element.

*41. A projection lens for a cathode ray tube comprising from the long conjugate side:*

*(a) a first lens unit of weak power comprising first and second elements, the first element having a lower dispersion than the second element and the second element having at least one aspheric surface, said first and second elements having positive and negative powers, respectively, at least in the vicinity of their clear apertures which serve to correct the lens' axial chromatic aberration;*

*(b) a second lens unit providing most of the positive power of the lens comprising third and fourth elements, the third element having a lower dispersion than the fourth element and the fourth element having at least one aspheric surface, said third and fourth elements having positive and negative powers, respectively, at least in the vicinity of their clear apertures which serve to correct the lens' axial chromatic aberration; and*

*(c) a third lens unit of negative power adapted to be closely coupled to a cathode ray tube.*

*42. A projection lens for a cathode ray tube comprising a rear lens unit adapted to be closely coupled to a cathode ray tube at the object end thereof, said lens unit having a strongly concave image side surface,*

*a front lens unit on the image side of said lens comprising a positive image side element having a dispersion similar to the dispersion of crown glass followed by a closely spaced negative element of high dispersion similar to the dispersion of flint glass, and*

*another lens unit providing substantially all of the positive optical power of said lens intermediate said front and rear lens units, said another lens unit including a negative element of high dispersion similar to the dispersion of flint glass on the object side thereof,*

*wherein the lens further includes a corrector lens unit of weak optical power having at least one aspherical surface positioned between said rear lens unit and said another lens unit so that the axial marginal rays from the long conjugate side of said lens intersect said corrector lens unit below the clear aperture thereof, and*

*said front lens unit and said another lens unit move in fixed relation and said rear lens unit together with said corrector lens unit moved in fixed relation but differentially with respect to said front lens unit and said another lens unit to vary the focal length of said lens.*

*43. A projection lens for a cathode ray tube comprising a rear lens unit adapted to be closely coupled to a cathode ray tube at the object end thereof, said lens unit having a strongly concave image side surface,*

*a front lens unit on the image side of said lens comprising a positive image side element having a dispersion similar to the dispersion of crown glass followed by a closely spaced negative element of high dispersion similar to the dispersion of flint glass, and*

*another lens unit providing substantially all of the positive optical power of said lens intermediate said front and rear lens units, said another lens unit including a negative element of high dispersion similar to the dispersion of flint glass on the object side thereof,*

*wherein the absolute value of the optical power of said negative lens element of said front lens unit increases from the optical axis to the clear aperture thereof due to at least one aspheric surface thereof.*

*44. A projection lens for a cathode ray tube comprising a rear lens unit adapted to be closely coupled to a cathode ray tube at the object end thereof, said lens unit having a strongly concave image side surface,*

*a front lens unit on the image side of said lens comprising a positive image side element having a dispersion similar to the dispersion of crown glass followed by a closely spaced negative element of high dispersion similar to the dispersion of flint glass, and*

*another lens unit providing substantially all of the positive optical power of said lens intermediate said front and rear lens units, said another lens unit including a negative element of high dispersion similar to the dispersion of flint glass on the object side thereof,*

*wherein said negative lens element of said front lens unit changes in optical power with height from the optical axis of the lens to contribute to correction of axial chromatic aberration in combination with the power of the preceding positive element of said front lens unit.*

*45. A projection lens for a cathode ray tube comprising a rear lens unit adapted to be closely coupled to a cathode ray tube at the object end thereof, said lens unit having a strongly concave image side surface,*

*a front lens unit on the image side of said lens comprising a positive image side element having a dispersion similar to the dispersion of crown glass followed by a closely spaced negative element of high dispersion similar to the dispersion of flint glass, and*

*another lens unit providing substantially all of the positive optical power of said lens intermediate said front and rear lens units, said another lens unit including a negative element of high dispersion similar to the dispersion of flint glass on the object side thereof,*

*wherein said front lens unit and said another lens unit move in the same direction but at differential rates to vary the focal length of said lens.*

* * * * *